United States Patent
Zeller et al.

(10) Patent No.: US 9,969,425 B2
(45) Date of Patent: May 15, 2018

(54) REAR WHEEL STEERING CONTROL

(71) Applicant: Robert Bosch GmbH, Stuttgart (DE)

(72) Inventors: Jeorg Zeller, Abstatt (DE); Lance Bredthauer, Livonia, MI (US); Celeste Cauley, Farmington Hills, MI (US); Michael Feldker, Abstatt (DE); Lars Koenig, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 14/782,610

(22) PCT Filed: May 20, 2014

(86) PCT No.: PCT/US2014/038703
§ 371 (c)(1),
(2) Date: Oct. 6, 2015

(87) PCT Pub. No.: WO2014/189877
PCT Pub. Date: Nov. 27, 2014

(65) Prior Publication Data
US 2016/0039455 A1 Feb. 11, 2016

Related U.S. Application Data

(60) Provisional application No. 61/825,207, filed on May 20, 2013.

(51) Int. Cl.
*B62D 6/00* (2006.01)
*B62D 6/02* (2006.01)
*B62D 7/15* (2006.01)

(52) U.S. Cl.
CPC .............. *B62D 6/02* (2013.01); *B62D 6/001* (2013.01); *B62D 7/159* (2013.01)

(58) Field of Classification Search
None
See application file for complete search history.

(56) References Cited

U.S. PATENT DOCUMENTS

| 4,720,790 A * | 1/1988 | Miki ...................... B62D 7/159 180/415 |
| 5,224,042 A | 6/1993 | Morrison |

(Continued)

FOREIGN PATENT DOCUMENTS

| CN | 101213127 | 7/2008 |
| CN | 101954904 | 1/2011 |

(Continued)

OTHER PUBLICATIONS

International Search Report and Written Opinion for Application No. PCT/US2014/038703 dated Aug. 28, 2014, 2014 (9 pages).

(Continued)

*Primary Examiner* — Rami Khatib
(74) *Attorney, Agent, or Firm* — Michael Best & Friedrich LLP

(57) ABSTRACT

A rear wheel steering system in a vehicle. The system includes a rear wheel steering actuator, a vehicle speed sensor, and an electronic control unit. The rear wheel steering actuator is coupled to a rear wheel of the vehicle and controls a steering angle of the rear wheel. The electronic control unit is coupled to the rear wheel steering actuator and the vehicle speed sensor and is configured to determine a speed of the vehicle and to limit the steering angle of the rear wheel based on the speed of the vehicle and a fault tolerant time of the rear wheel steering system.

19 Claims, 11 Drawing Sheets

(56) References Cited

U.S. PATENT DOCUMENTS

| | | | | |
|---|---|---|---|---|
| 5,615,117 | A * | 3/1997 | Serizawa | B62D 6/04 |
| | | | | 180/410 |
| 5,754,966 | A * | 5/1998 | Ichikawa | B62D 7/159 |
| | | | | 180/410 |
| 8,364,350 | B2 * | 1/2013 | Yanagi | B60G 7/006 |
| | | | | 701/42 |
| 2003/0042790 | A1 | 3/2003 | Amberkar | |
| 2005/0065697 | A1 * | 3/2005 | Niino | B60T 8/1755 |
| | | | | 701/71 |
| 2006/0065470 | A1 * | 3/2006 | Manken | B66F 9/07568 |
| | | | | 180/410 |
| 2008/0114514 | A1 * | 5/2008 | Auguet | B62D 7/159 |
| | | | | 701/42 |
| 2012/0029772 | A1 * | 2/2012 | Fujita | B62D 7/159 |
| | | | | 701/41 |

FOREIGN PATENT DOCUMENTS

| | | |
|---|---|---|
| CN | 202448976 | 9/2012 |
| EP | 0470630 | 2/1992 |
| JP | 06247330 A * | 9/1994 |

OTHER PUBLICATIONS

Chinese Patent Office Action for Application No. 201480027775.6 dated Jan. 25, 2017 (17 pages—including translation).

\* cited by examiner

REAR WHEEL STEERING CONTROL

RELATED APPLICATION

The present application claims the benefit of prior filed U.S. Provisional Patent Application No. 61/825,207 filed on May 20, 2013, the entire content of which is hereby incorporated by reference.

BACKGROUND

The present invention relates to controlling rear wheel steering. Specifically, the invention sets limits to a rear wheel steering angle to ensure safe operation of a vehicle.

SUMMARY

In one embodiment, the invention provides a rear wheel steering system in a vehicle. The system includes a rear wheel steering actuator, a vehicle speed sensor, and a controller. The rear wheel steering actuator is coupled to a rear wheel of the vehicle and controls a steering angle of the rear wheel. The controller is coupled to the rear wheel steering actuator and the vehicle speed sensor and is configured to determine a speed of the vehicle and to limit the steering angle of the rear wheel based on the speed of the vehicle and a fault tolerant time of the rear wheel steering system.

In another embodiment, the invention provides a method of controlling a maximum steering angle of a rear wheel of a vehicle. The method includes determining a speed of the vehicle, determining a maximum yaw rate of the vehicle based on the speed of the vehicle, determining a fault tolerant time of a rear wheel steering system, determining, by a controller, a maximum steering angle of a rear wheel of the vehicle based on speed of the vehicle and the maximum fault tolerant time of the rear wheel steering system, and limiting, by the controller, the steering angle of the rear wheel of the vehicle based on the determined maximum steering angle of the rear wheel of the vehicle.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
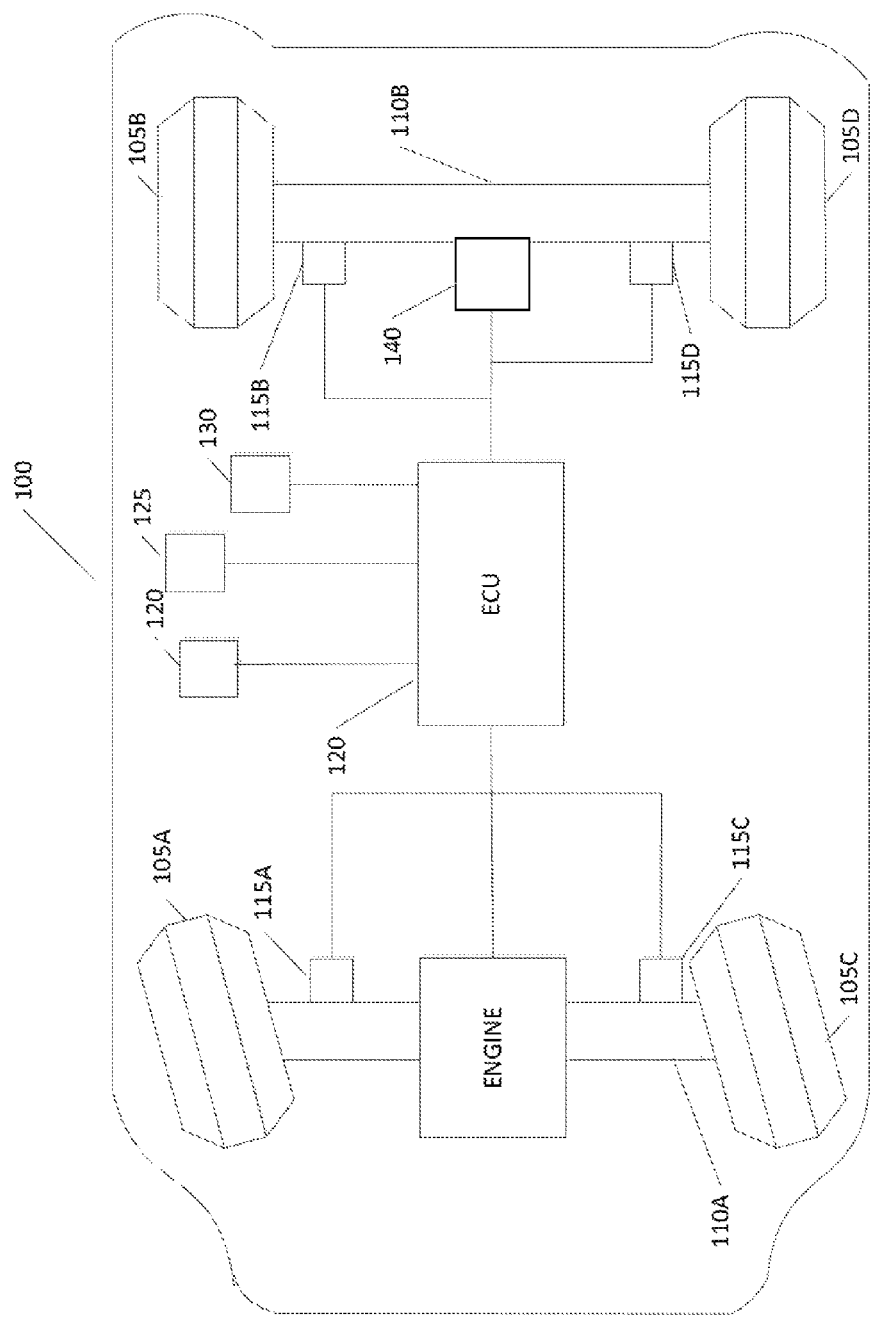
FIG. 1 is a schematic view of a vehicle.

FIG. 1 shows a schematic view of a vehicle 100. The vehicle 100 has four wheels 105A, 105B, 105C, and 105D. The wheels 105A, 105B, 105C, and 105D are connected to two axles 110A and 110B, as shown. The four wheels are monitored by a plurality of wheel speed sensors 115A, 115B, 115C, and 115D. The wheel speed sensors 115A, 115B, 115C, and 115D are coupled to an electronic processing unit ("ECU") 120 (i.e., a controller). The vehicle 100 also includes other sensors such as a yaw rate sensor 125, a lateral acceleration sensor 130, and a longitudinal acceleration sensor 135. In some embodiments, the ECU 120 communicates with other devices (e.g., sensors, other controllers) in the vehicle 100 via a bus (e.g., a CAN bus). The rear wheels 105B and 105D are steered by a RWS actuator 140 at an angle controlled by the ECU 120. In some embodiments, the angle is controlled by a device other than the ECU.

The ECU 120 includes a processor (e.g., a microprocessor, microcontroller, ASIC, DSP, etc.), computer readable media or memory (e.g., flash, ROM, RAM, EEPROM, etc.), which can be internal to the processor, external to the processor, or a combination thereof, and input/output circuitry. The ECU 120 can also include various modules (e.g., hardware of software) such as an Electronic Stability Program (ESP) and a Vehicle Dynamics Management (VDM) module. In other embodiments, the ESP and VDM are separate modules and not part of the ECU.

The invention seeks to achieve safety goals and criteria for Electronic Stability Program/Vehicle Dynamics Management (ESP/VDM) systems for rear wheel steering (RWS) actuators, and to meet specific Automotive Safety Integrity Level (ASIL) ratings.

In some embodiments, limits are set for yaw rate changes, e.g., to <5°/s for a vehicle speed <50 kph, and <3°/s for a vehicle speed >50 kph to ensure safe operation of the vehicle.

The range of RWS angle that can be used safely for specific speeds varies based on the vehicle. For example, one sample vehicle has safe RWS angles at a variety of speeds as shown in Table 1 below.

TABLE 1

| Vehicle Speed (km/h) | Max Yaw Rate [°/s] | Resulting angle [°] |
|---|---|---|
| 30 | 5 | 1.32 |
| 50 | 5 | 0.86 |
| 80 | 4 | 0.51 |
| 100 | 3 | 0.34 |
| 150 | 3 | 0.30 |
| 200 | 3 | 0.27 |
| 250 | 3 | 0.27 |

A fault tolerant time (FTT) needs to be determined. The FFT is how quickly the vehicle should react to an adverse situation. Assuming that the RWS actuator can rotate the rear wheels at a rate of 20°/s, the FTT times for various speeds of the sample vehicle are shown in Table 2.

TABLE 2

| Vehicle Speed (km/h) | Max Yaw Rate [°/s] | Resulting FTT [ms] |
|---|---|---|
| 30 | 5 | 66 |
| 50 | 5 | 43 |
| 80 | 4 | 26 |
| 100 | 3 | 17 |
| 150 | 3 | 15 |
| 200 | 3 | 14 |
| 250 | 3 | 13 |

An RWS actuator has a very short FFT (e.g., 13 ms for a 20°/s maximum RWS actuator rotation speed). However, in most systems, control of the RWS is distributed over multiple devices (e.g., an external RWS angle requester, an ESP, etc.). Therefore, the total FFT of the system needs to be accounted for. For example, the ESP may have a minimum 100 ms FFT. Therefore, in an embodiment where the ESP controls the RWS angle, the FTT is 100 ms plus the 13 ms for the RWS actuator. In order to achieve an ASIL D rating (the highest rating), the speed of the vehicle needs to be low enough such that a response (e.g., detect a problem and shut down RWS (i.e., stop turning the rear wheels)) within 113 ms (the threshold) is adequate. No special control needs to be used at speeds where the FTT is below the threshold. For speeds where the FTT is above the threshold, external measures are needed to support the ESP and RWS actuator to achieve an ASIL D rating.

Figure 2:
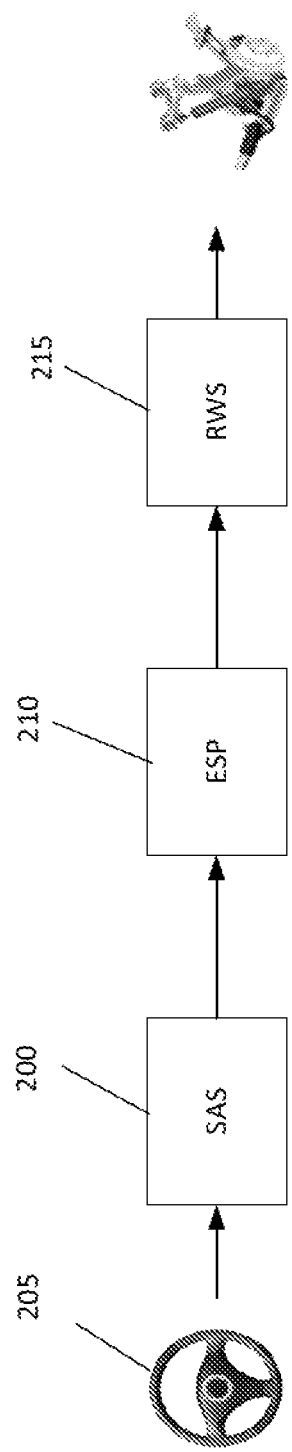
FIG. 2 is a block diagram of an RWS system.

FIG. 2 shows a block diagram of an embodiment for operating the RWS system. A steering angle sensor 200 detects the amount of turning being requested by a driver via a steeling wheel 205. This amount of turning (i.e., the steering angle) is sent to an ESP 210 which in turn sends a rear wheel turning angle request to a RWS actuator 215, which in turn controls the RWS angle at the wheels.

Figure 3:
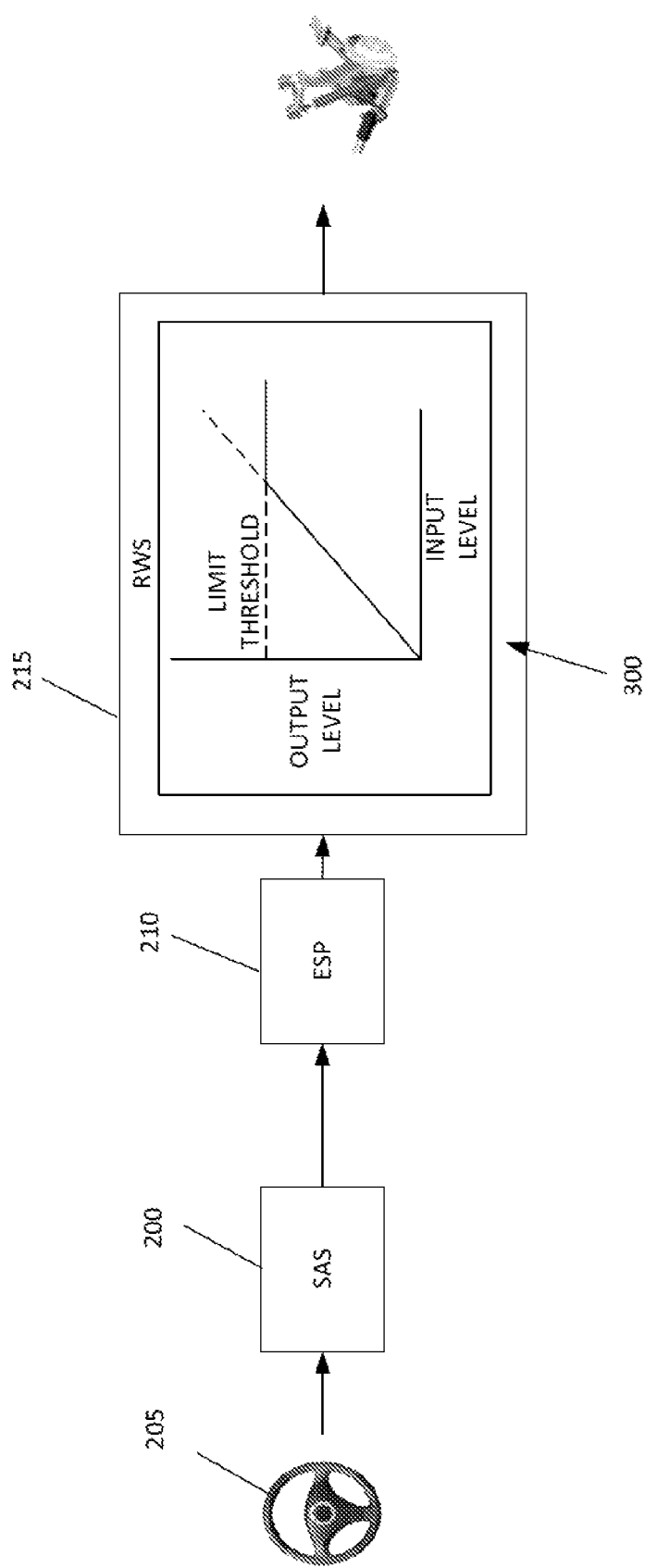
FIG. 3. is a block diagram of an alternative RWS system.

FIG. 3 shows an alternative block diagram in which the RWS actuator 215 includes a graph 300 of a control scheme for limiting the RWS angle based on the vehicle speed. The RWS actuator 215 receives the input level (the angle request from the ESP 210) and outputs an angle level. The outputted angle level is equal to the input level for speeds having an FTT below the threshold. Once the speed of the vehicle exceeds the speed for which the FFT exceeds the threshold, the output level (RWS angle) is held constant. Thus, the rear wheel steering angle does not go above a safe level. This method has drawbacks, as the rear wheel steering angle is limited to an angle that is less than desired for circumstances where the angle requested is larger than the threshold, and which still may be safe. For example, driving around a tight turn, it may be desirable to have a RWS angle greater than the threshold.

As shown in Table 1, the allowable safe RWS angle decreases as vehicle speed increases. Estimating a vehicle speed incorrectly on the high side is non-critical because the system will limit the RWS angle to a lesser angle than is allowed for the actual speed. In contrast, estimating a vehicle speed too low can result in a critical situation where the RWS angle exceeds the maximum for the actual vehicle speed. In addition, calculating the minimum FTT will be critical if the vehicle speed is estimated too low.

Determining the vehicle speed using wheel speed sensors has an ASIL C rating which is below the desired ASIL D rating for the RWS system. Therefore, additional data must be used to determine the vehicle speed. For example, other sensors (e.g., lateral and longitudinal sensors) can be used to supplement the data from the wheel speed sensors to determine the vehicle speed more accurately and achieve an ASIL D rating.

Figure 4A:
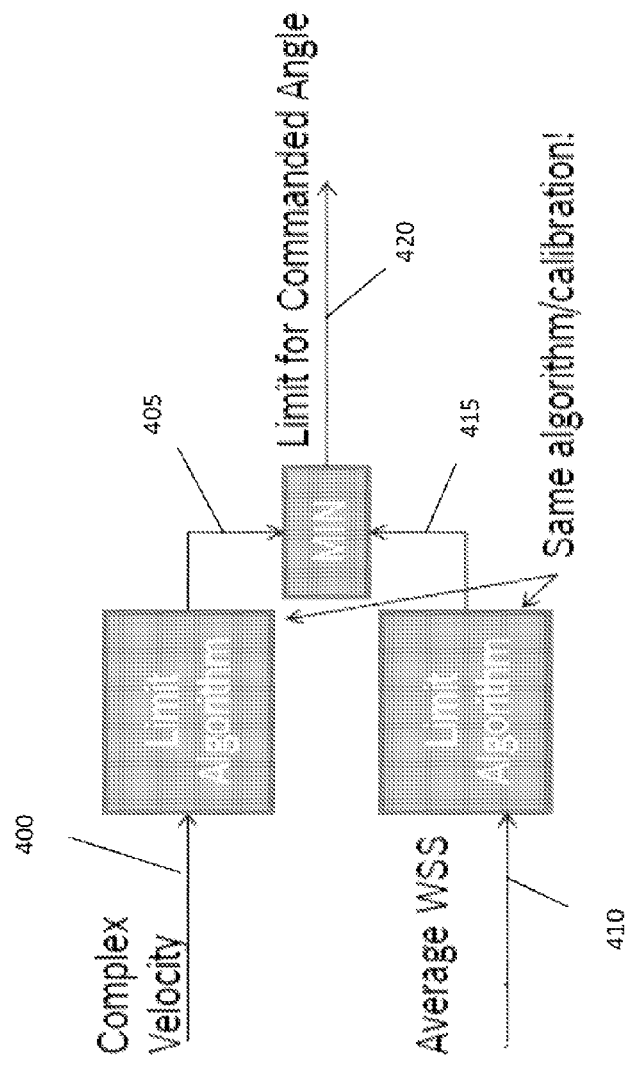
FIG. 4A is a block diagram of setting of a RWS commanded angle limit.
Figure 4B:
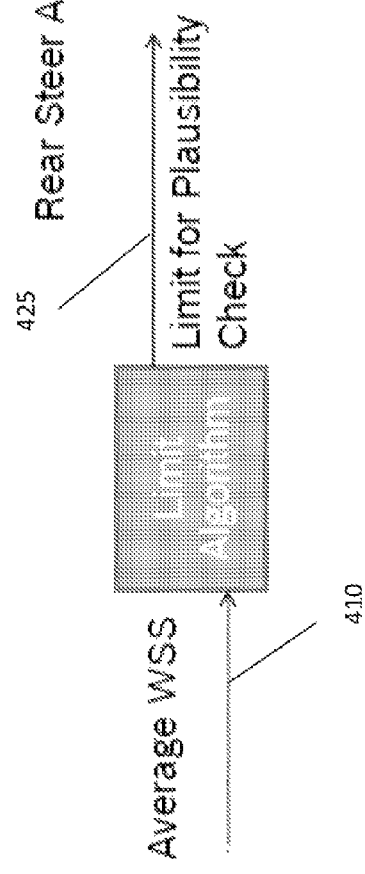
FIG. 4B is a block diagram of setting a RANTS plausibility angle limit.

To ensure that a vehicle speed used to set the RWS angle limit is not less than the actual speed of the vehicle a plausibility check is performed. FIGS. 4A and 4B illustrate a method of performing this plausibility check. A complex velocity 400 (e.g., using one or more methods of determining velocity such as lateral and longitudinal acceleration, yaw rate or other sensed conditions) is used by the ESP to generate a first RWS limit 405, and a speed from wheel speed sensors 410 is used by the ESP to generate a second RWS limit 415. The minimum of the first and second RWS limits 405 and 415 then becomes the commanded angle limit 420. At the same time, the speed from the wheel speed sensors 410 is used by the RWS actuator to generate a plausibility check angle limit 425. If the plausibility limit, is less than the commanded limit, the plausibility limit is used otherwise the commanded limit is used.

Figure 5:
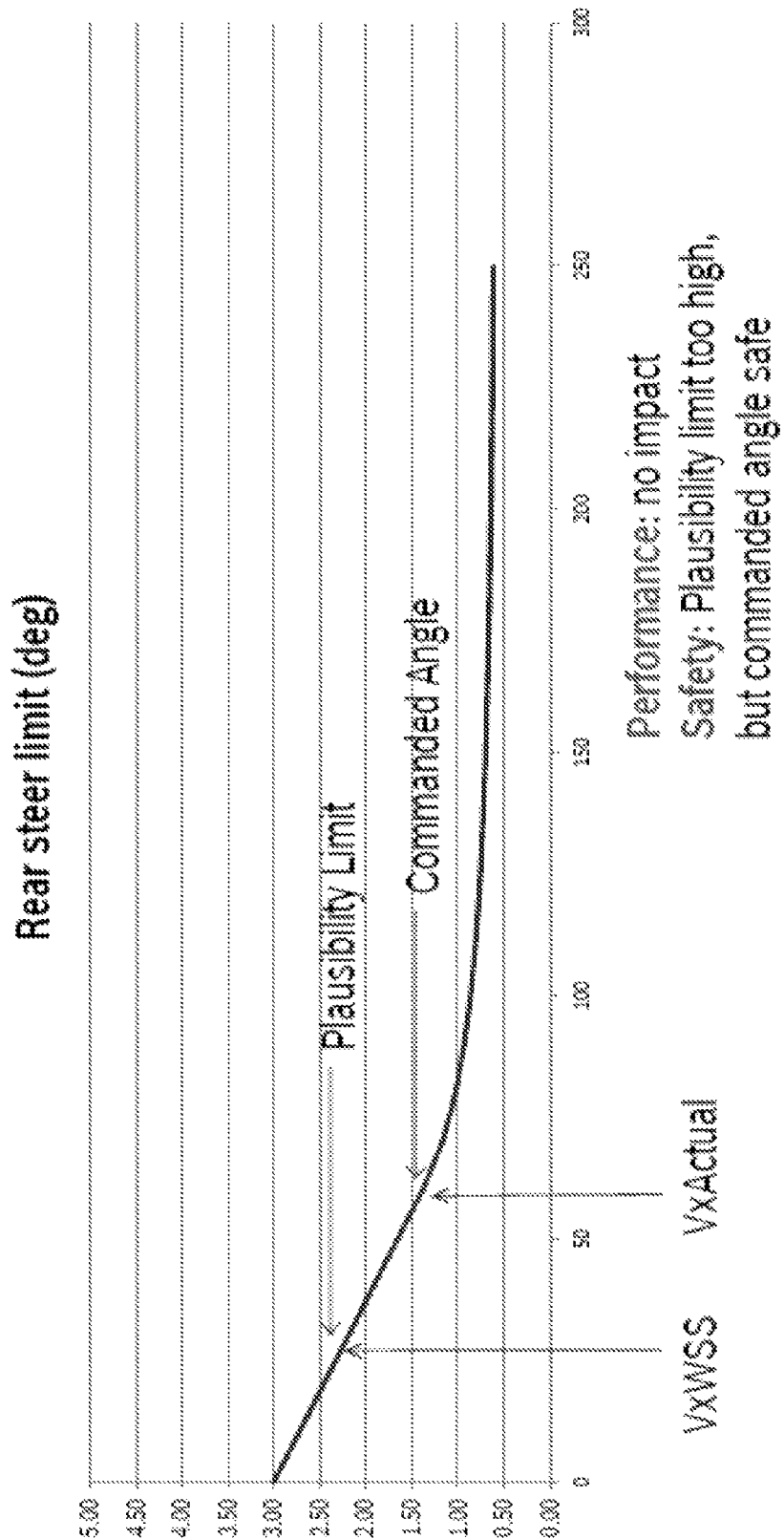
FIG. 5 is a graph of angle limits for a vehicle that is braking heavily.

FIG. 5 shows a condition where the vehicle is being heavily braked. In this case, the wheels may be locking up and the speed detected by the wheel speed sensors VxWSS is less than the actual speed VxActual. In the example shown, the plausibility limit set by the RWS actuator is about 2.25° and the commanded angle limit set by the ESP is about 1.8° (using the complex velocity because it is less than the wheel speed sensor velocity). Because the plausibility limit is higher than the commanded limit, there is no change in the commanded limit.

Figure 6:
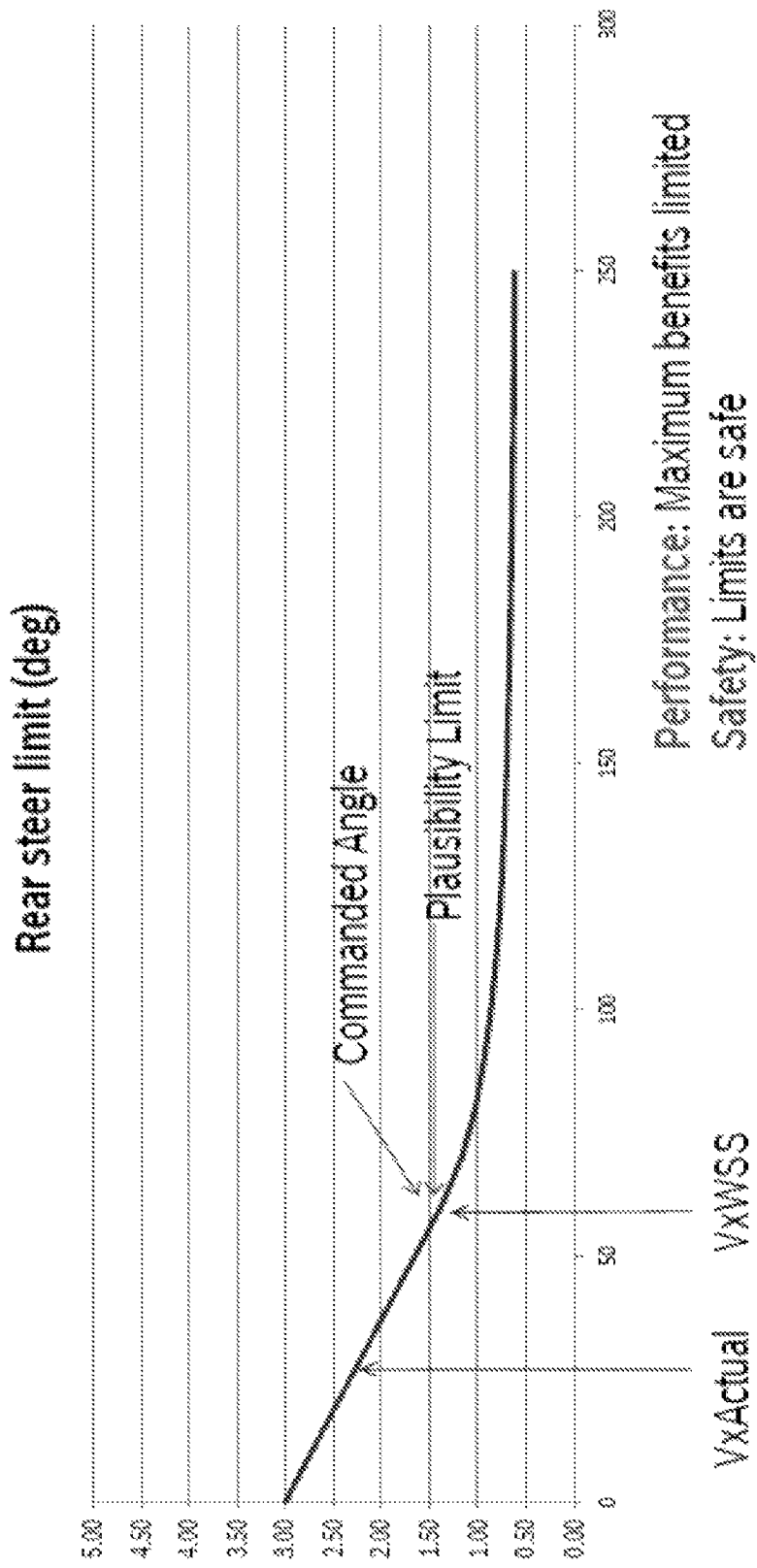
FIG. 6 is a graph of angle limits for a vehicle that is slipping.

FIG. 6 shows a condition where the wheels are spinning (e.g., starting on ice). In this case, the speed detected by the wheel speed sensors VxWSS is greater than the actual speed VxActual. The ESP sets the commanded angle limit to VxWSS because this is less than VxActual. Therefore, both the commanded angle limit and the plausibility limit are the same.

Figure 7:
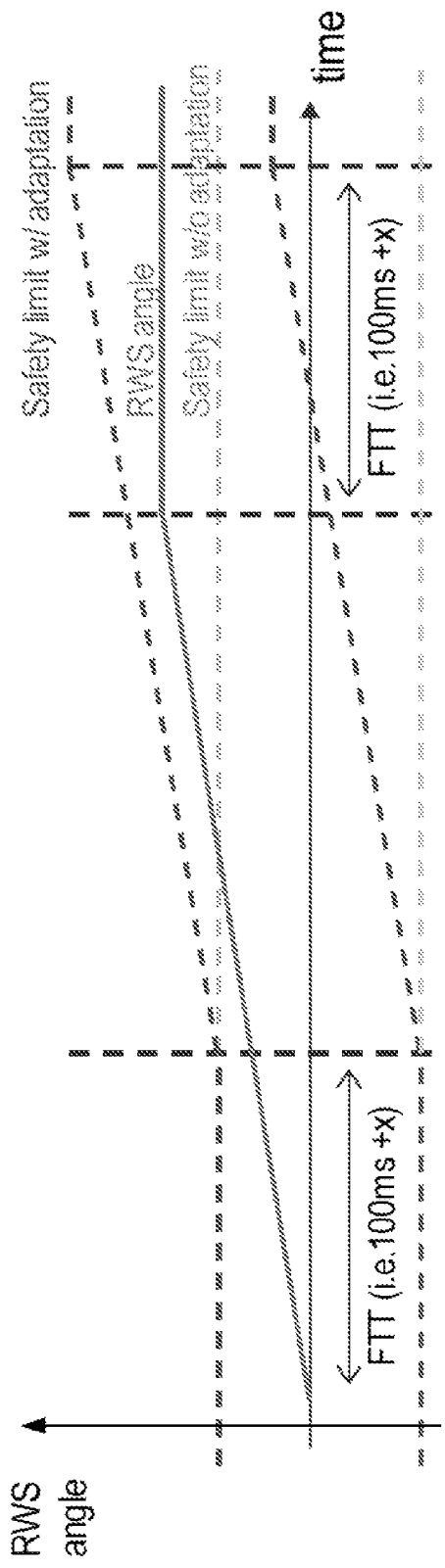
FIG. 7 is a graph showing adjusted RWS limits based on a sliding window.

In some embodiments, the system starts with the hard limit (e.g., such as graph 300 of FIG. 3). The RWS limit is the original threshold. After the ESP FTT has elapsed (e.g., 100 ms), if an event did not occur causing a switch off of the RWS, it is assumed to be safe (i.e., meet the ASIL D rating). Therefore, the angle limitation is adjusted, by adapting the maximum angle (from Table 1) for the vehicle's speed to the limited RWS output from previous time (e.g. 100 ms), rather than the center position. The control is performed by the RWS actuator and results in an adjusted limit as shown in FIG. 7, and in an ASIL D rating for the system.

The RWS limit can be obtained from a look-up table or can be calculated by the RWS actuator. To calculate the RWS limit, start with an Ackermann equation (eq. 1).

$$\dot{\psi}_{ACK} = \frac{v_x \delta}{L\left(1 + \left(\frac{v_x}{v_{ch}}\right)^2\right)} \quad \text{(eq. 1)}$$

where:

$\dot{\psi}_{ACK}$=reference yaw rate, vx=vehicle speed in x direction,

δ=wheel turn angle,

L=wheel base, and

Vch=characteristic velocity.

Then eq. 1 is rearranged for front wheel angle (eq. 2).

$$\delta = \frac{\dot{\psi} L \left(1 + \frac{v_x^2}{v_{ch}^2}\right)}{v_x} \quad \text{(eq. 2)}$$

Next, lateral acceleration, $$\dot{\psi} = \frac{A_y}{v_x},$$

can be substituted for reference yaw rate (eq. 3).

$$\delta = \frac{A_y L \left(1 + \frac{v_x^2}{v_{ch}^2}\right)}{v_x^2} \quad \text{(eq. 3)}$$

Figure 8:
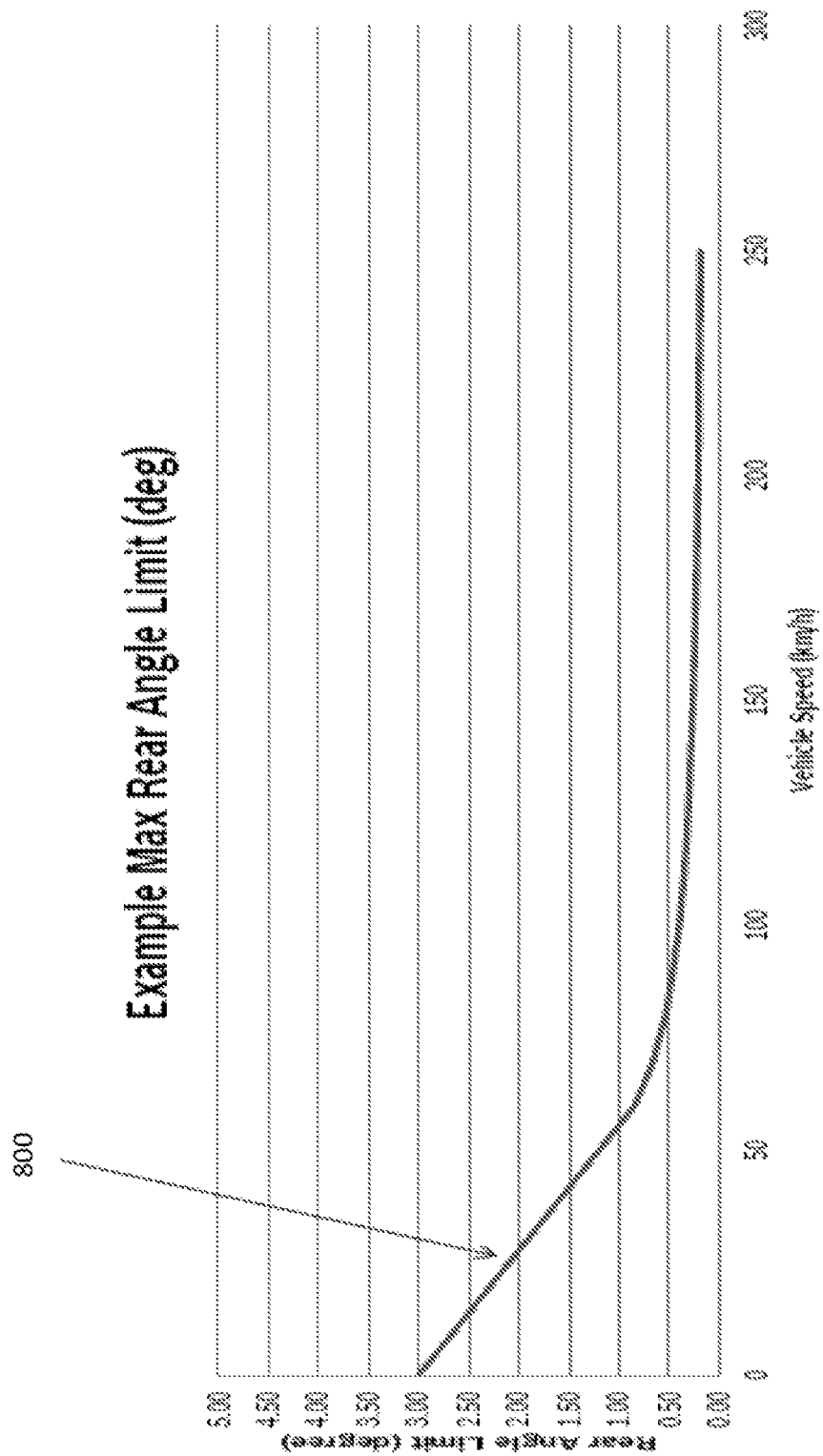
FIG. 8 is a graph of RWS limits for a sample vehicle.

FIG. 8 shows a graph of the maximum RWS angle (i.e., the RWS limit) for a vehicle with a characteristic velocity of 130 km/h and using a lateral acceleration of 0.13 g (obtained from a safety metric). The limit shown in FIG. 8 has been modified slightly to have a linear ramp 800 at low speeds. This is done to reduce sensitivity to vehicle speed errors.

Figure 9:
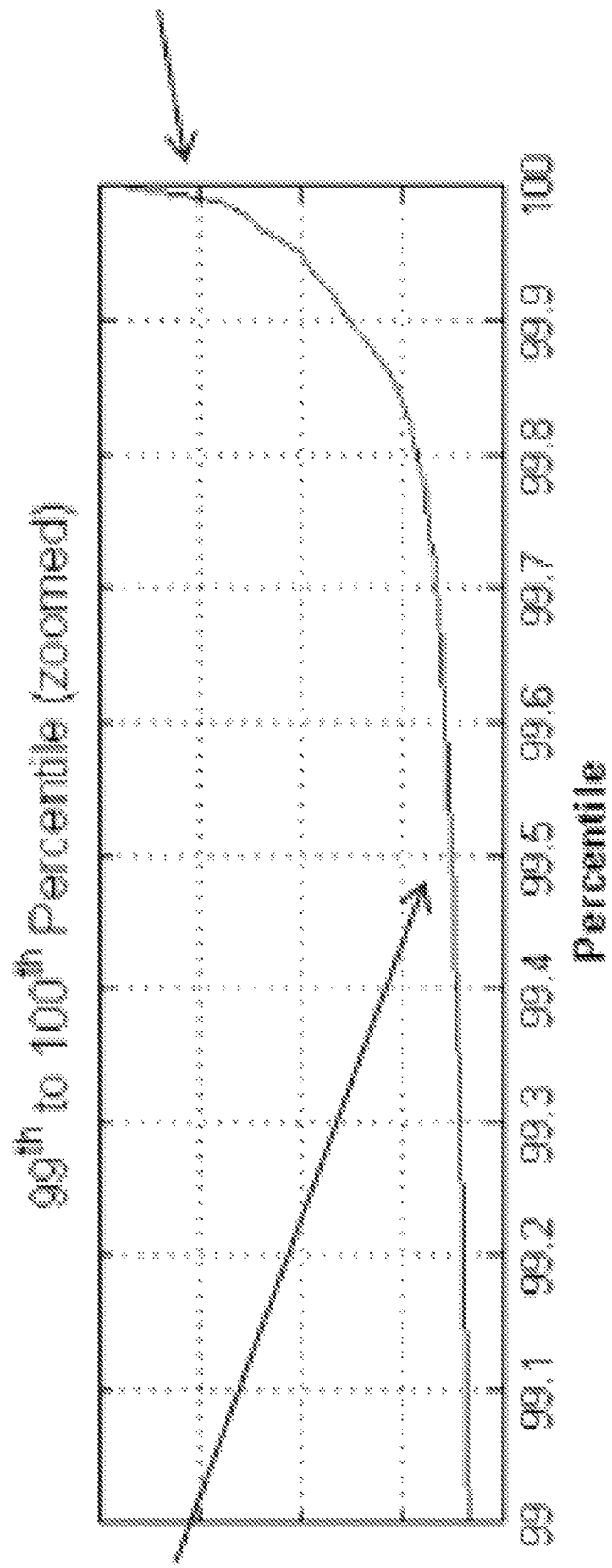
FIG. 9 is graph showing the occurrence of evasive driving events.
Figure 10:
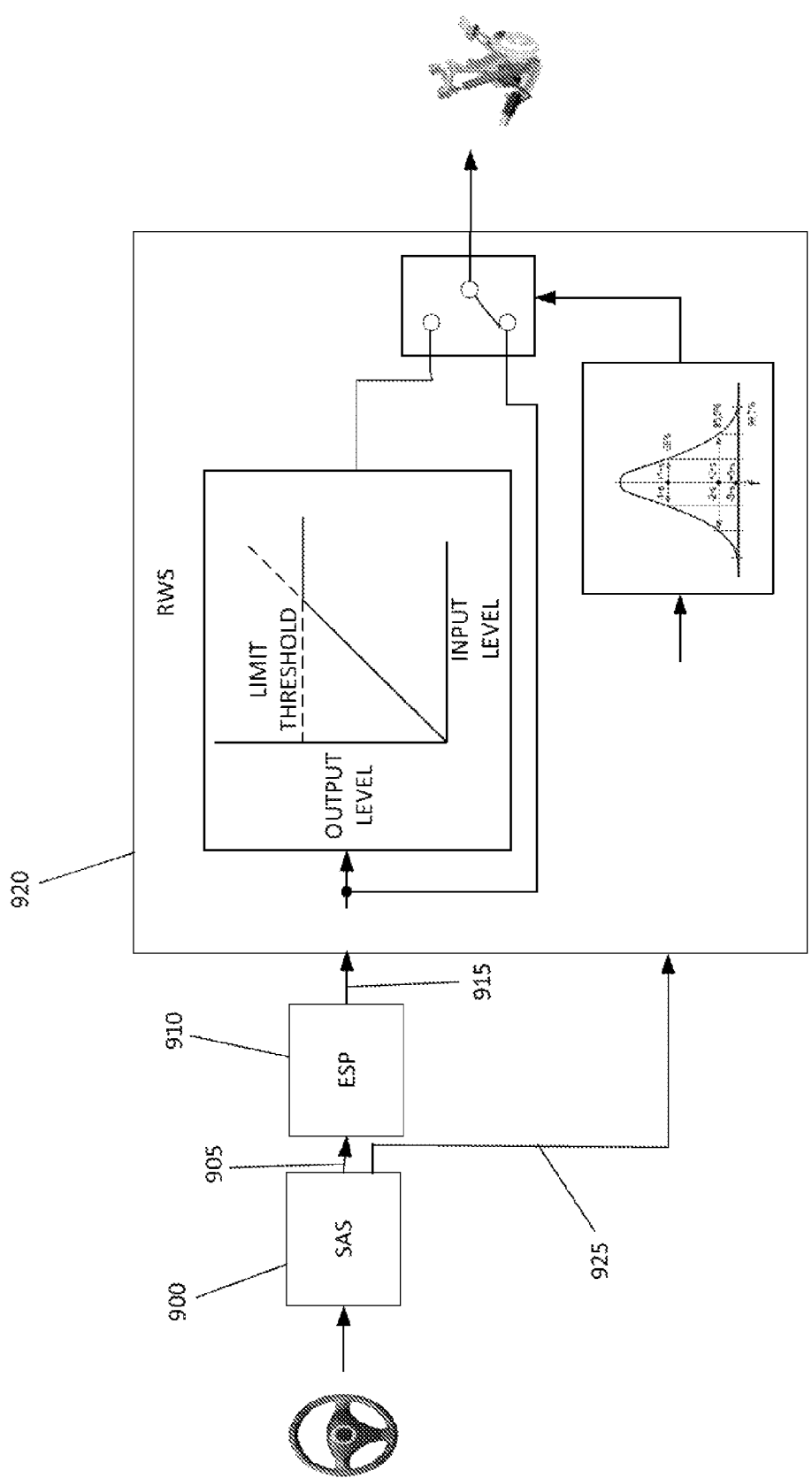
FIG. 10 is a block diagram of an RWS system which releases the RWS limit in the event of an evasive driving maneuver.

In some situations it may be desirable to expand the RWS limits. For example, when the driver is performing an evasive maneuver, such as to avoid an object. It has been determined that these events occur less than 1% of the time. FIG. 9 shows that, during test drive cycles designed to attain +/−0.6 g lateral acceleration at all velocities, about 99.5% of all data samples analyzed have less than 90 deg/sec of steering wheel rate. Therefore a factor can be learned from steering wheel angle rate (e.g., on CAN bus) and used to modify the maximum angle limit without increasing the safety risk for normal driving in 99.5% of situations Because the ASIL rating is determined based on severity, exposure, and controllability, these dynamic events can be separated out resulting in a lower ASIL B rating being acceptable. As shown in FIG. 10, a steering angle sensor 900 detects a steering angle and a rate of change of steering angle of the steering wheel. The steering angle 905 is provided to the ESP 910 which determines a RWS angle and provides the RWS angle 915 to the RWS actuator 920. The steering angle sensor 900 also provides the steering angle rate of change 925 to the RWS actuator 920. The RWS actuator 920 controls the RWS angle based on the RWS angle 915 received from the ESP 910 (using the hard limit or the adapted limit as described above) unless the driver is performing an evasive maneuver (determined based on the rate of change 925). If the driver is performing an evasive maneuver, the RWS actuator controls the RWS angle to that requested by the ESP 910 without any limitations.

Figure 11:
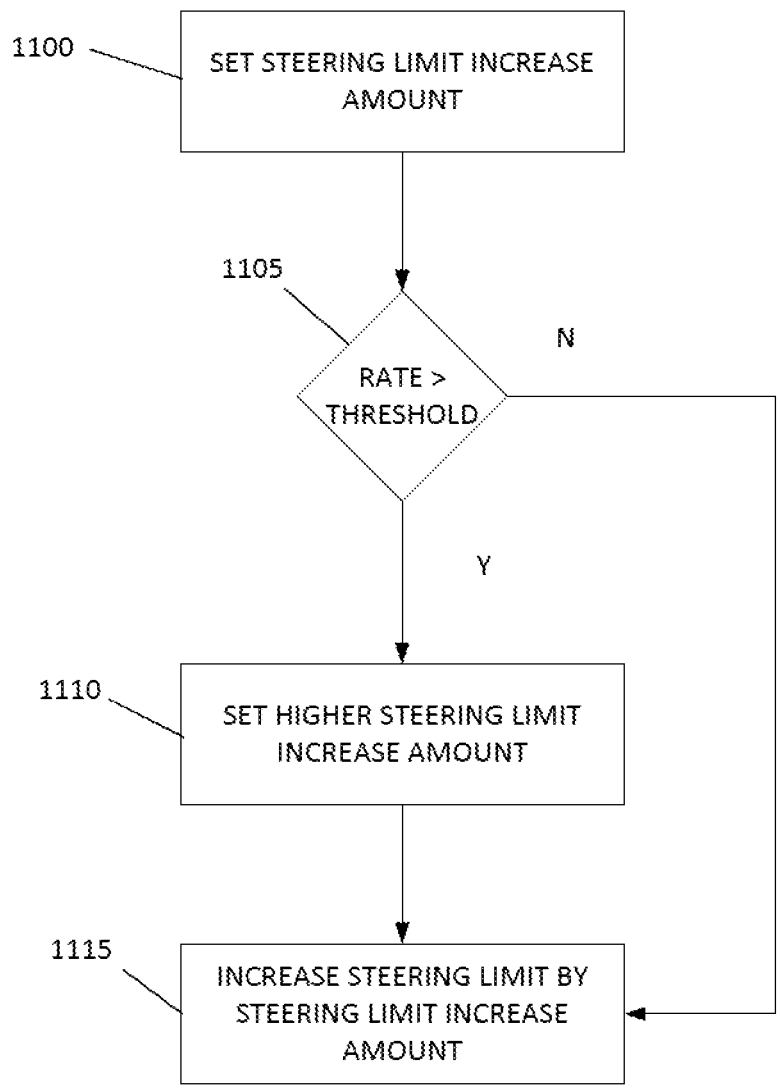
FIG. 11 is a flow chart of the opera ion for setting a limit increase for the RWS limit.

FIG. 11 shows the operation of the RWS actuator for adjusting the RWS limit. A limit increase amount is set to the greater of zero and the limit increase amount minus a decay rate (step 1100). The decay rate is determined by the need to keep the increase long enough to complete the evasive maneuver, but not so long such as to exceed 1% total exposure. Next the steering angle change rate is compared to a threshold (step 1105) to determine if the driver is performing an evasive maneuver. If the driver is performing an evasive maneuver, the limit increase amount is set to the greater of the present limit increase amount and the steeling angle change rate minus a minimum rate (e.g., 90 deg/sec) multiplied by a gain value (step 1110). The steering angle limit is then increased by the steering angle increase amount (step 1115). If the driver is not performing an evasive maneuver (step 1105), the steering angle limit is increased (step 115) by the steering angle increase amount determined at step 1100.

Thus, the invention provides, among other things, a method of setting a RWS angle limit.

What is claimed is:

1. A rear wheel steering system in a vehicle, the system comprising:
  a rear wheel steering actuator coupled to a rear wheel of the vehicle and controlling a steering angle of the rear wheel;
  a vehicle speed sensor; and
  a controller coupled to the rear wheel steering actuator and the vehicle speed sensor and configured to determine a speed of the vehicle and to limit the steering angle of the rear wheel based on the speed of the vehicle and a fault tolerant time of the rear wheel steering system, wherein the fault tolerant time of the rear wheel steering system is indicative of a determined amount of time for the rear wheel steering system to react to an adverse situation,
  wherein the controller is configured to limit the steering angle of the rear wheel by determining a maximum steering angle of the rear wheel and limiting the steering angle of the rear wheel based on the determined maximum steering angle of the rear wheel, and
  wherein the controller is further configured to increase the maximum steering angle of the rear wheel after a time period equal to the fault tolerant time has elapsed and during which the maximum steering angle was not reached.

2. The rear wheel steering system of claim 1, wherein the vehicle speed sensor is a wheel speed sensor.

3. The rear wheel steering system of claim 1, further comprising, one or more additional speed sensors.

4. The rear wheel steering system of claim 3, wherein the one or more additional speed sensors are from a group including a longitudinal acceleration sensor, a lateral acceleration sensor, and a yaw rate sensor.

5. The rear wheel steering system of claim 3, wherein the steering angle of the rear wheel is based on the higher of a speed determined using the one or more additional speed sensors and a speed determined using the vehicle speed sensor.

6. The rear wheel steering system of claim 1, wherein a maximum yaw rate is set based on the speed of the vehicle.

7. The rear wheel steering system of claim 1, wherein a maximum steering angle is determined based on the speed of the vehicle and a maximum yaw rate.

8. The rear wheel steering system of claim 1, wherein the maximum steering angle of the rear wheel is calculated by the rear wheel steering actuator.

9. The rear wheel steering system of claim 1, wherein the maximum steering angle of the rear wheel is determined by a look up table.

10. The rear wheel steering, system of claim 1, wherein the maximum steering angle of the rear wheel is calculated using an equation.

11. The rear wheel steering system of claim 1, wherein the maximum steering angle of the rear wheel is increased when a rate of change of a requested steering angle exceeds a threshold.

12. A method of controlling a maximum steering angle of a rear wheel of a vehicle, the method comprising:

determining a speed of the vehicle;
determining a maximum yaw rate of the vehicle based on the speed of the vehicle;
determining a fault tolerant time of a rear wheel steering system;
determining, by a controller, a maximum steering angle of the rear wheel of the vehicle based on speed of the vehicle and the fault tolerant time of the rear wheel steering system;
adjusting, by the controller, the steering angle of the rear wheel of the vehicle, wherein the steering angle of the rear wheel of the vehicle is limited to the determined maximum steering angle of the rear wheel of the vehicle; and
increasing the maximum steering angle of the rear wheel after a time period equal to the fault tolerant time of the rear wheel steering system has elapsed and during which a previous maximum steering angle was not reached.

13. The method of claim 12, wherein a fault tolerant time of a rear wheel steering actuator varies based on the speed of the vehicle, and wherein the fault tolerant time of the rear wheel steering actuator is included in the fault tolerant time of the rear wheel steering system.

14. The method of claim 13, wherein the vehicle speed is determined by a wheel speed sensor and a plurality of additional sensors.

15. The method of claim 14, wherein the maximum steering angle of the rear wheel is based on the higher of a speed determined by the plurality of additional sensors and a speed determined by the wheel speed sensor.

16. The method of claim 13, further comprising determining the maximum steering angle of the rear wheel using a look up table.

17. The method of claim 13, further comprising calculating the maximum steering angle of the rear wheel using an equation.

18. The method of claim 13, further comprising increasing the maximum steering angle of the rear wheel when a rate of change of a requested steering angle exceeds a threshold.

19. The method of claim 12, wherein determining the fault tolerant time of the rear wheel steering system includes:
determining a fault tolerant time for each device of a plurality of devices that control rear wheel steering of the vehicle, wherein the plurality of devices includes a rear wheel steering actuator; and
calculating the fault tolerant time of the rear wheel steering system as a sum of the fault tolerant times for the plurality of devices.

* * * * *